United States Patent Office 3,804,787
Patented Apr. 16, 1974

---

3,804,787
PAINT COMPOSITIONS WHICH ARE EMULSIFI-
ABLE IN AQUEOUS DETERGENT
Peter Francis Nicks, Maidenhead, Gladys Mary Jones, Wokingham, and Alan Stuart Baker, Slough, England, assignors to Imperial Chemical Industries Limited, London, England
No Drawing. Filed June 29, 1972, Ser. No. 267,656
Claims priority, application Great Britain, July 6, 1971, 31,661/71
Int. Cl. C09d 3/64, 3/72, 5/06
U.S. Cl. 260—22 R     28 Claims

ABSTRACT OF THE DISCLOSURE

Paints based on water-immiscible liquid, which can be removed from an applicator by emulsification in aqueous synthetic detergent, are prepared by a process including a step in which the pigment is treated with an auxiliary resin which will co-emulsify with the pigment in the aqueous detergent and is adsorbed on the pigment in preference to the base resin of the paint.

---

This invention relates to a method of producing paints based on a solution of resin in a water-immiscible diluent, more particularly to the production of decorative paints which are emulsifiable in aqueous detergent.

The choice of a paint diluent is influenced by a number of factors. These factors include the effect of the diluent on the properties of the paint, the potential hazards in applying the paint, and the ease of cleaning used equipment and of cleaning up spillage. In recent years there has been a trend towards the use of water as the diluent in decorative paints particularly since applicators such as brushes and rollers, and any spillage, are readily cleaned with water. Certain properties of a water-based paint and the characteristics of a coating produced therefrom are often deficient, however, as compared with paint based on a water-immiscible diluent such as aliphatic hydrocarbon. It is difficult, for example, to formulate water-based emulsion paints which have good application and drying characteristics and yet yield high gloss coatings. Moreover, water-based paints containing a water-soluble resin often yield coatings which are sensitive to water due to hydrophilic groups necessarily present in the polymer to impart solubility in water.

On the other hand, decorative paints based on a solution of resin in hydrocarbon have desirable characteristics not usually possessed by the water-based paints, for example they have good application and drying characteristics and a coating of high gloss can be produced. Furthermore, since water-sensitive groups in the paint resin can be kept to a minimum these paints have good resistance to water. Nevertheless, applicators and any spillage must be cleaned with non-aqueous solvents which are both costly and inconvenient. It is therefore desirable to produce a paint which is based on a water-immiscible diluent but which can be removed from an applicator in the presence of water.

Whilst we have been surprised to find that many unpigmented solutions in aliphatic hydrocarbon of conventional resins used in decorative paints (which will produce coatings of high gloss and good water resistance) can be emulsified in aqueous solutions of ionic or non-ionic synthetic detergents, for example sodium dodecyl benzene sulphonate or an ethylene oxide/nonylphenol condensate, we have also found that when a pigment is present the pigment and resin are incompletely co-emulsified. Thus, paints which comprise these conventional resins together with pigment are incompletely emulsified in aqueous detergent solutions and are only partially removed from applicators, particularly brushes, by cleaning in aqueous detergent solution. By the term "paint" we mean hereafter that a composition comprises pigment and a solution of film forming resin in water-immiscible diluent.

We have now found that certain modified paints which are based on a solution of resin in a water-immiscible liquid, such as aliphatic hydrocarbon, can be readily emulsified in water in the presence of a synthetic detergent of the type used for domestic purposes, for example sodium dodecyl benzene sulphonate. These paints can therefore be removed from an applicator by emulsification in readily available aqueous detergent solutions. This is in contrast to prior suggestions for the removal from an applicator of paint containing a water-immiscible liquid which depend upon the dissolution of the paint resin in water and the presence in the paint of a proportion of liquid which is miscible with water and with the water-immiscible liquid.

According to this invention we provide a method of producing a paint composition, said composition comprising a pigmented solution of a water-insoluble film forming base resin in a water-immiscible liquid and the solution of base resin being completely emulsifiable in an aqueous synthetic detergent solution when the pigment is absent but incompletely co-emulsifiable therein with pigment when the pigment is present, wherein one of the method steps comprises treating at least a proportion of the pigment in dispersion in a water-immiscible liquid with an auxiliary resin which (a) is co-emulsifiable in the aqueous detergent solution with the pigment when dissolved in the water-immiscible liquid of the paint composition and (b) is preferentially adsorbed by the pigment from a solution of both the base resin and the auxiliary resin in the water-immiscible liquid of the paint composition.

The invention also provides improved paints produced by the processes herein described and paint additives herein described as auxiliary resins.

By a base resin we mean that resin which is normally responsible for the main film forming characteristics of the paint and this resin is preferably present in a proportion of at least 50% by weight of the total resin content of the paint. The base resin may comprise more than one resin, for example two co-reactive resins. Conversely the auxiliary resin will normally be present in a proportion of not more than 50% by weight of the total resin content of the paint and preferably not more than 25% by weight. In certain cases, however, it may be desirable to employ more than 50% of the auxiliary resin and less than 50% of the base resin.

The auxiliary resin must contain appropriate and sufficient chemical groups, some of which will associate with the pigment surface and others of which will promote its emulsification in an aqueous detergent solution. The emulsification or incomplete emulsification, as the case may be, in an aqueous detergent solution of a pigmented or unpigmented solution of either the base resin or the auxiliary resin can be readily determined by the paint chemist but when using these terms in relation to our invention we refer to a simple test as follows:

A sample of 10 g. of the resin under test is dissolved in 100 g. of the water-immiscible liquid to give a resin solution, (a). A further sample of 10 g. of the resin is dissolved in sufficient of the same liquid to give a grinding consistency and ball-milled for 16 hours with 100 g. of titanium dioxide to give a stable dispersion of pigment in resin solution. The total water-immiscible liquid is then increased to 100 g. (b).

Samples of 2 g. of each of (a) and (b) are taken separately and vigorously shaken by hand in a stoppered bottle of 100 ml. capacity with 50 ml. of warm water containing 0.33 g. sodium dodecyl benzene sulphonate in the case of resins containing anionic or non-ionic hydrophilic groups or 0.5 g. cetyl pyridinium bromide in the case of resins containing cationic hydrophilic groups and allowed to stand. A sample of (a) or (b), pigmented or not, which provides an emulsion showing substantially no settlement after 10 minutes standing is understood, for the purposes of this invention, to be emulsifiable whereas a sample which shows substantial settlement after 10 minutes is understood to be incompletely emulsifiable.

It is essential that the auxiliary resin is preferentially adsorbed by the pigment from a solution of base resin and auxiliary resin. It is known that the adsorption of resins on to a pigment surface is generally a dynamic process and provided that the auxiliary resin contains appropriate chemical groups which promote preferential adsorption onto the pigment as compared with the base resin it is suitable in our invention. In some cases, when the pigment is contacted with base resin before it is contacted with auxiliary resin, there may be a delay before the full realization of the properties of paint made according to the invention, as discussed below.

The determination of the relative extent of adsorption by pigment of base resin and auxiliary resin is readily carried out by established methods. In one method, known quantities of the resins in solution in the water-immiscible liquid, and in the weight ratio present when the pigment is treated according to this invention are contacted with the pigment until an equilibrium is reached. The relative extent of adsorption of each resin can then be determined. Preferably, when equal weights of resin are used in this test, that amount of auxiliary resin which is adsorbed by the pigment is at least twice that of the base resin.

Chemical groups which, when present in the auxiliary resin, promote association with the pigments include, for example, hydroxyl, carboxyl, sulphonate, sulphate, phosphate, and those groups described in British Pats. 1,108,261 and 1,159,252.

In most cases the auxiliary resin should be compatible with the base resin, so that in general the two resins will form one phase when they are mixed in any proportions. In many cases a non-pigmented coating film comprising a mixture of these resins is also optically clear.

We have already referred to certain prior paints, capable of removal from an applicator with water, in which the main diluent is water-immiscible, and is usually combined with a proportion of water-miscible diluent. The paint resin soluble in the diluent is so modified with hydrophilic groups to achieve at least a measure of water solubility that an ultimate coating produced from the paint is unduly sensitive to water and otherwise deficient in desirable properties. It is an advantage of the paint produced by our process that the co-emulsification in aqueous detergent of the base resin, auxiliary resin and pigment requires a much smaller total proportion of hydrophilic groups than in the former case. The proportion of added auxiliary resin, and hence also the proportion of hydrophilic groups present therein, can be kept to a minimum consistent with the necessary preferential adsorption of auxiliary resin and satisfactory co-emulsification of pigment. The water-sensitivity and other possible deficiencies of a coating produced from our paint, is also kept to a minimum. Further, we can now employ as a major component of a paint a base resin which, because it can be formulated in a conventional manner with a low level of hydrophilic groups, will confer very desirable properties on a paint even though it is itself only incompletely emulsifiable with pigment in aqueous detergent solution. In many cases the admixture of the necessary proportion of auxiliary resin to promote pigment emulsification has little adverse effect on these desirable paint properties.

The invention is particularly applicable to film-forming base resins which contain air-drying moieties, that is the moieties contain autoxidizable groups which on exposure to the atmosphere are responsible for an increase in the molecular weight of the resin. Paints based on air-drying resins are notably difficult to remove from an applicator after use. Particularly appropriate air-drying resins for paints are those containing drying oil moieties for example bodied drying oils, drying oil-modified alkyds, drying oil-modified polyurethanes, urethane/drying oil-modified alkyds, vinyl/drying oil-modified alkyds, drying oil-modified polyamides and oil modified epoxy esters. Other suitable air-drying base resins include styrene/unsaturated polyester blends and polymers containing allyl ether groups.

Appropriate non-drying base resins include epoxy resins and alkyd/aminoplast blends.

The base resin may be a single resin or a mixture of resins according, for example, to the requirements of the ultimate paint. Thus the base resin may comprise for example, a single alkyd resin or a thixotropic resin derived from a mixture of an alkyd resin and a polyamide. The paint may also contain a crosslinking agent, for example a melamine/formaldehyde or phenol/formaldehyde resin.

Pigments notably difficult to co-emulsify with resin in the conventional "decorative"-type paints carried in water-immiscible diluents include titanium dioxide but the paints of this invention may contain a wide range of other pigments, extending pigments and fillers. Coloring or opacifying pigments include the iron oxides, whether black, yellow, red or brown; chrome oxide green; phthalocyanine blue; phthalocyanine green; red lead; cobalt blue; graphite; vegetable carbon black; mineral carbon black; metallic aluminium; metallic lead; metallic zinc; white lead sulphate, white lead carbonate; zinc oxide; extending pigments and fillers include barium sulphate; calcium sulphate; calcium carbonate; magnesium carbonate; calcium silicate; magnesium silicate; and silica.

In one preferred embodiment of the invention the auxiliary resin is of the same chemical type as the base resin. When the base resin is an alkyd resin, for example, the auxiliary resin is preferably also an alkyd resin but the auxiliary resin will contain further appropriate groups to promote emulsification and association with the pigment.

Suitable auxiliary resins for use in the invention may be classified into two principal categories according to the nature of the hydrophilic groups in the resin primarily responsible for the satisfactory emulsification of the paints in aqueous detergent solution. Hydrophilic groups which promote satisfactory emulsification of pigment are either (a) non-ionic or (b) ionic.

Particularly suitable non-ionic groups which may be present in the auxiliary resin comprise polymerized moieties of lower alkylene oxides, notably ethylene oxide. Terminal hydroxyl groups of the moieties may be etherified with, for example, lower alcohols such as methanol and ethanol.

The alkylene oxide moieties may be introduced into the auxiliary resin, for example, by reacting a hydroxyl-terminated poly(alkylene glycol) with a complementary reactive group, e.g. a carboxyl group, in a preformed resin. Alternatively, a hydroxyl-terminated poly(alkylene glycol) or moiety thereof may be employed as one starting material in a condensation reaction, as for example in the preparation of an alkyd resin. The auxiliary resin should contain at least 5% by weight based on the total weight of resin and preferably at least 10% by weight of a moiety of poly(ethylene glycol), optionally etherified, the preferred range of molecular weight of the moiety being 100–5000. Particularly suitable resins for air-drying paints include drying oil-modified alkyds, drying oil-modified polyurethane resins and polyurethane/drying oil-modified alkyds containing 10–50% by weight of poly(ethylene glycol) moieties of molecular weight 400–1000. These auxiliary resins are of course particularly suitable for use with base resins which are of the same general type. In general the auxiliary resins containing moieties of poly(ethylene glycol) are of relatively low acid value, preferably less than 30 mg. KOH/g. The acid value of the base resin is also preferably less than 30.

The auxiliary resins may also contain moieties of other non-ionic water-soluble polymeric materials, for example poly(vinyl pyrrolidone).

The emulsification characteristics of the auxiliary polymer may also be conferred by a high concentration of hydroxyl groups. In such a case the hydroxyl value of the resin should be at least 30 and may be as high as necessary, for example up to 170, bearing in mind that the hydroxyl content of the total film-forming resin should be kept to a minimum. Preferred auxiliary resins for use with base resins which are conventional air-drying alkyd resins, polyurethane-modified alkyds, polyurethane oils and the like and which have low hydroxyl values e.g. in the range 10-30, are resins of this same general type but, have a higher hydroxyl value, for example from 70-120. Preferably these auxiliary resins have a fatty acid content in the range 30-75% by weight based on the weight of resin.

The auxiliary resin may contain a combination of non-ionic groups which promote satisfactory emulsification of the paints in aqueous detergent solution, for example appropriate proportions of poly(ethylene glycol) moieties and hydroxyl groups. Since, as indicated above, it is necessary for the auxiliary resin to contain appropriate groups which promote association with the pigment, for example hydroxyl groups, the hydroxyl value may be determined by a consideration of both requirements.

A further suitable class of auxiliary resin is that of random, graft or block copolymers which are soluble in the water-immiscible liquid. One component of the copolymer becomes associated with the pigment and another component contains suitable water solubilizing hydrophilic groups. Typical such copolymers are of higher alkyl (e.g. lauryl, cetostearyl) methacrylates or a poly 12-hydroxy stearic acid/glycidyl methacrylate condensate with monomers which contain hydrophilic non-ionic groups. Suitable comonomers include, for example poly(ethylene glycol) mono methacrylate and other monomers containing poly(ethylene oxide) moieties, and monomers such as vinyl pyrrolidone. Preferably the total weight of water-soluble groups in the copolymers is in the range 40-80% by weight. In certain cases a homopolymer of certain monomers, e.g. vinyl pyrrolidone, may be suitable as an auxiliary resin.

The second main class of auxiliary resins is that in which the emulsification of pigment is promoted by ionic groups, and preferably by anionic groups. Again, in one preferred embodiment of the invention the auxiliary resin is of the same general type as the base resin but it contains more ionic groups. Anionic groups are preferred, particularly suitable anionic groups being carboxyl, sulphonate, phosphate or borate groups and preferably the acid value of the auxiliary resin then lies in the range 40-200 mg. KOH/g. The acid value of the base resin is then preferably less than 10 mg. KOH/g. Types of resin containing anionic groups which are particularly suitable for use with alkyd base resins include, for example, (a) oil modified alkyds containing acid groups introduced, for example, by maleinization or by half-ester formation with maleic, phthalic, succinic or trimellitic anhydrides, or by the use of dimethylol propionic acid in the alkyd preparation, (b) random or graft copolymers of higher alkyl (e.g. lauryl, cetostearyl, methacrylates or poly(12-hydroxy stearic acid)/glycidyl methacrylate with monomers containing anionic groups e.g. carboxyl, sulphonate, phosphate and borate groups. Suitable comonomers in the preparation of the copolymers of type (b) include for example acrylic acid, methacrylic acid, vinyl sulphonate, and sulphoethyl methacrylate.

When the auxiliary resin is an oil-modified alkyd resin containing appropriate anionic groups it is preferred that there is a fatty acid content of 35-65% by weight of the total resin. When auxiliary resins of this type are used in conjunction with an alkyd resin as the base resin in decorative paints, it is necessary to observe the limits of acid value and fatty acid content stated above in order to ensure satisfactory emulsification of the paint and at the same time compatibility with those base resins which have the desirable properties of high gloss and resistance to water.

Cationic groups may also be present in auxiliary resins, for example the resin may contain the salts of amino groups or the quaternary ammonium salts of tertiary amines for example diethylamino ethyl methacrylate quaternized with dimethyl sulphate or ethyl bromide.

In certain cases where the auxiliary resin is of relatively high acid value e.g. 80-150, for example and alkyd resin prepared using dimethylol propionic acid, and the base resin is of relatively low acid value e.g. 5-40, for example an oil-modified alkyd, the paints produced by our process are emulsifiable in dilute aqueous solutions of bases as well as in aqueous detergent solutions. Suitable bases include ammonia and water-soluble organic amines. The base may also be added to the paint so that the paint can be emulsified by addition of water only.

The term "water-immiscible liquid," in which the base resin is dissolved, includes a wide range of aliphatic and aromatic organic liquids such as esters, ketones and hydrocarbons; we are particularly concerned with aliphatic hydrocarbons which are commonly used in the formulation of decorative paints and which may boil in the range 100-300° C. A particularly suitable hydrocarbon is commercially available white spirit of boiling range 140-200° C. which is predominantly aliphatic hydrocarbon but which contains up to 15% of aromatic hydrocarbon.

The present process may be used to produce a wide range of paints, for example gloss, undercoat and primer paints and including paints which are of modified structure, for example to give non-Newtonian flow characteristics. It is particularly applicable to the production of paints which are normally applied by brush or roller.

The pigment may be treated in dispersion with the auxiliary resin in the absence of base resin or in admixture with a proportion of the base resin. The pigment may also be treated with auxiliary resin after the pigment has been treated with base resin. In this last case the full effect of the auxiliary resins on the emulsification of the paint is only realized when the preferential adsorption of the auxiliary resin has taken effect, i.e. after the paint has been stored, for example after a storage period of up to 1 month. Preferably the paint is prepared by a process in which the pigment is first dispersed in a solution in water-immiscible liquid of either the auxiliary resin alone or a blend of auxliary resin and base resin of not more than 50% of the total resin content of the final paint composition. It may be desired to treat only a proportion of the pigment in the paint composition according to the present process. Alternatively, the pigment may be treated with auxiliary resin and stored for subsequent use.

In general it may be necessary only to modify a conventional paint-making process by adding auxiliary resin in the required proportion at the millbase stage. The paints of this invention may be otherwise similar to conventional paints both in manufacture and in use and may contain conventional paint additives.

The invention is illustrated by the following examples in which parts and percentages are by weight unless otherwise stated.

EXAMPLE 1

(a) Preparation of base resin A

A long oil-length linseed oil alkyd was prepared by a 75% solids solution in white spirit from linseed oil fatty acid, phthalic anhydride and pentaerythritol in a weight ratio 68/20/12. The solution had a viscosity of 60-80 poise at 20° C. and the resin an acid value of 11 mg. KOH/g. A solution of this resin was emulsifiable in the absence of pigment but when pigmented it was incompletely emulsifiable according to the test described in the specification since more than 50% by volume of the emulsified pigmented solution had settled out after 10 mins. standing.

(b) Preparation of auxiliary resins

Poly(ethylene glycol)-modified alkyd resins were prepared as 75% solids solutions in white spirit by co-condensing materials as specified and in the proportions stated below. The poly(ethylene glycol) (PEG) was of molecular weight 600. Each of the resulting resins I–IV, whether pigmented or not, was emulsifiable according to the test described in the specification since less than 10% (and in general less than 5%) of the emulsified pigmented solution had settled out after 10 minutes standing. Each auxiliary resin I–IV was preferentially adsorbed by the pigment, when compared with base resin A as shown in the following test:

100 g. of rutile titanium dioxide was dispersed by ball-milling with a 1:1 blend of auxiliary resin and base resin in white spirit solution, there being present a total of 8.25% by weight of blended resins based on the pigment. After dispersion and standing for 16 hours the resulting mill base was centrifuged and the supernatant resin solution analyzed to determine the amounts of each resin present in solution and thus that amount which remained in association with the pigment. In the case of resin II, for example, it was found that four times as much auxiliary resin as base resin had been absorbed by the pigment.

Thus resins I–IV were auxiliary resins according to the invention. Resin V, when pigmented, was not emulsifiable according to test described in the specification and, therefore, is not an auxiliary resin according to the invention. It is included for comparison purposes.

(I) Pentaerythritol/poly(ethylene glycol)/phthalic anhydride/linseed oil fatty acid=1.6/0.6/2.0/3.(molar ratio). Acid value=22.6 mg. KOH/g., hydroxyl value =17, percent PEG=21.

(II) Pentaerythritol/poly(ethylene glycol)/phthalic anhydride/maleic anhydride/linseed oil fatty acid=1.05/ 1.2/0.5/0.9/3. Acid value=10.3 mg. KOH/g., hydroxyl value=56, percent PEG=40.

(III) Pentaerythritol/poly(ethylene glycol)/phthalic anhydride/tolylene diisocyanate/linseed oil fatty acid= 1.05/1.2/1.3/0.55/3. Acid value=9.6 mg. KOH/g., hydroxyl value=10, percent PEG=37.4.

(IV) Pentaerythritol/glycerol/poly(ethylene glycol/trimellitic anhydride/ linseed oil fatty acid=0.6/0.6/ 1.2/1.2/3. Acid value=30.1 mg. KOH/g., hydroxyl value=30, percent PEG=39.1.

(V) Pentaerythritol/poly(ethylene glycol)/phthalic anhydride/linseed oil fatty acid=1.10/0.113/1.95/3. Acid value=3.5 mg. KOH/g., hydroxyl value=35, percent PEG=5.0.

(c) Preparation of high gloss paints

From base resin A alone: 184 parts of rutile titanium dioxide were dispersed to produce a millbase in 60 parts of the solution of base resin A prepared in (a) above together with 20 parts of white spirit. To the millbase was added a further 280 parts of the solution of resin A, 4.25 parts of cobalt drier solution in white spirit (containing 6% cobalt) and 16 parts of a lead drier solution in white spirit (containing 24% of lead).

From base resin A and an auxiliary resin:

(I) A millbase was prepared by dispersing 184 parts of rutile titanium dioxide in 30 parts of the solution of base resin A and 34 parts of the solution of auxiliary resin I diluted with 20 parts of white spirit. To the millbase was added a further 276 parts of the solution of base resin A together with cobalt and lead driers as used above. (10% auxiliary resin.)

(II) 165.6 parts of rutile titanium dioxide and 18.4 parts of Monastral Blue were dispersed in 70 parts of auxiliary resin II and 20 g. white spirit. 272 parts of base resin A solution were then added to this milllbase together with cobalt and lead driers. (20% auxiliary resin.)

(III) A millbase was prepared by dispersing 184 parts of rutile titanium dioxide in 30 parts base resin A solution, 20 parts white spirit, 34 parts solution of auxiliary resin III. To the millbase was added a further 272 parts of base resin A solution and cobalt and lead driers as above. (10% auxiliary resin.)

(IV) A millbase was prepared by dispersing 184 parts of titanium dioxide in 30 parts base resin A solution, 25 parts white spirit, and 3.4 parts solution of auxiliary resin IV. To this millbase was added a further 306.6 parts of the solution of base resin A, and the lead and cobalt driers as above. (2.5% auxiliary resin.)

(V) A millbase was prepared by dispersing 184 parts of titanium dioxide in 34 parts solution of auxiliary resin V, 20 parts white spirit, 30 parts solution of base resin A. To the millbase was added a further 276 parts of resin solution A and cobalt and lead driers as above. (10% auxiliary resin.)

These paints were each diluted to a viscosity of 4 poise, measured at $10,000^{-1}$ at 25° C., and they yielded coatings of high gloss, good opacity and good resistance to water.

(d) Emulsification of paints prepared in (c)

The ease of emulsifying the above paints in an aqueous detergent solution was assessed by the following test:

A paint brush having a 2″ width of bristles was filled with paint and applied to a surface. The process was repeated several times ensuring that the paint was worked thoroughly into the interior and into the stock of the brush. The brush was allowed to dry for 30 minutes and then immersed for 15 minutes in warm water (40–45° C.) containing 3.3 g. sodium dodecyl benzene sulphonate (in the present case of a paint containing anionic or non-ionic hydrophilic groups) or 5.0 g. cetyl pyridinium bromide (in the case of a paint containing cationic hydrophilic groups), in 500 ml. of water. The brush was agitated vigorously in the detergent solution. The brush was again agitated in a further similar quantity of detergent solution of the same strength and any paint adhering to the outer bristles removed by scrubbing with a small brush. After rinsing, the cleanliness of the brush was assessed by the amount of visible paint retained on the bristles and in the stock.

The paint prepared from base resin A alone was not satisfactorily removed from the brush. A sticky residue, which could not be removed by treatment with further aqueous detergent remained on the brush bristles. The paints prepared using a proportion of auxiliary resin I–IV were readily removed from the brush. The paint prepared from resin solution V could not be readily removed from the brush and a sticky residue remained.

EXAMPLE 2

(a) Preparation of base resin B

A long oil-length oil-modified phenolic resin was prepared by heating a blend of 75 parts bodied linseed oil (viscosity 4 poise) with 25 parts of a commercially available resin-modified phenolic resin ("Crayvallac" 212) at 240° C. until the resultant resin when dissolved in white spirit at 68% solids had a viscosity of 10 secs. measured in a bubble tube at 25° C. The resin had an acid value of 5 mg. KOH/g. and an oil content of 75%. The resin was emulsifiable in the absence of pigment but when pigmented was incompletely emulsified by the test described in the specification. When base resin B was compared with auxiliary resin II in the pigment-resin association test of Example 1, auxiliary resin II was more strongly adsorbed by the pigment than was resin B.

(b) Preparation of undercoat paints 610 parts of calcium carbonate and 68 parts of rutile titanium dioxide were dispersed in 51.4 parts of base resin solution B and 150 parts of white spirit to produce a millbase. A further 304.2 parts of resin solution B, 20 parts of white spirit and the same proportion of driers based on the total resin content used in Example 1 were added to the millbase, and the paint further diluted to 3 poise viscosity.

The preparation of undercoat paint was repeated as above except that the pigments were dispersed in a blend of 33.8 parts of the base resin solution B and 16 parts of the solution of auxiliary resin II referred to in Example 1 instead of base resin B alone. (5% auxiliary resin.) Both of these paints produced very satisfactory undercoatings.

(c) Emulsification of paint

Using the test described in Example 1, the paint based only on resin B was not satisfactorily removed from the brush whereas the paint based on the blend of resin B and auxiliary resin II was satisfactorily removed from the brush.

EXAMPLE 3

(a) Base resin C

A thixotropic alkyd resin commercially available as Gelkyd 357W (Cray Valley Products Limited) and consisting of a polyamide-modified soya bean oil alkyd having an acid value of 10 mg. KOH/g. and an oil content of 65% was used as a 60% solids solution in white spirit. This resin was emulsifiable in the absence of pigment but when pigmented was incompletely emulsified by the test described in the specification. When base resin C was compared with auxiliary resin II in the pigment-resin association test of Example 1, resin II was more strongly adsorbed by the pigment that was resin C.

(b) Preparation of gloss paints (i) A thixotropic gloss paint was prepared by dispersing 146.0 parts of rutile titanium dioxide in 33.4 parts of the solution of resin C described above and 25 g. of white spirit. To this millbase were added, with vigorous stirring 298.4 parts of the solution of resin C heated to 65–70° C., 3.4 parts of a white spirit solution of cobalt driers (6% cobalt), 12.6 parts of a white spirit solution of lead driers (24% lead) and 10 parts of dipentene.

(ii) A thixotropic full gloss paint was prepared as described above in (i) except that the pigment was initially dispersed in a blend of 13.5 parts of the solution of auxiliary resin II described above and 16.5 parts of the solution of base resin C instead of with 33.4 parts of base resin C solution.

(iii) A thixotropic full gloss paint was prepared as described above in (i) except that to the mill base was added a blend of 13.5 parts of the solution of resin II described above and 271.5 parts of the solution of resin C heated to 65–70° C. Driers and dipentene were added as in (i).

These paints were each diluted to a viscosity of 2.5 poise and they yielded coatings of high gloss, good opacity and good resistance to water.

(c) Testing of paints

The freshly prepared paint of (b)(ii) above was satisfactorily removed from a brush by the test of Example 1. The freshly prepared paints described in (b)(i) and (b)(iii) above were not satisfactorily removed from the brush by this method. After storage for 1 month at 40° C. no change was noted in the ease of removal from the brush of paint (i) whereas paint (iii) was then readily removed from the brush by the test of Example 1. This demonstrates that an auxiliary resin is eventually effective even when not added at the millbase stage.

EXAMPLE 4

(a) Preparation of auxiliary resin VI

An 80/20 copolymer of vinyl pyrrolidone/cetostearyl methacrylate was prepared by solution polymerization in xylol/isopropanol (70/30 wt./wt.) at the reflux temperature using ADIB as initiator. The final solution was of 39.3% solids content. This resin, when pigmented, was emulsifiable according to the test described in the specification. When base resin A was compared with auxiliary resin VI in the pigment-resin association test of Example 1, resin VI was more strongly adsorbed by the pigment than was resin A.

(b) Preparation of paint

A gloss paint pigmented with titanium dioxide was prepared by the method described in Example 1(III) from base resin A and using 10% of auxiliary resin VI (based on the total paint resin) in the preparation of the millbase.

(c) Emulsification of paint

Paint prepared from base resin A alone was incompletely emulsified from a paint brush. The paint prepared using in addition auxiliary resin VI was satisfactorily emulsified from the brush by the test method of Example 1.

A 50/50 vinyl pyrrolidone/cetostearyl methacrylate copolymer was incompletely co-emulsified with pigment by the test described in the specification and thus is not an auxiliary resin according to the invention.

EXAMPLE 5

(a) Preparation of auxiliary resin VII

An alkyd resin was prepared as a 5% solution in white spirit from the following ingredients in the following molar proportions: Pentaerythritol/phthalic anhydride/soya bean oil fatty acid=2.75/2/3. The resin has an acid value of 7.3 and a hydroxyl value of 171. This resin, when when pigmented, was emulsifiable by the test described in the specification.

When base resin C was compared with auxiliary resin VII in the test of Example 1, resin VII was more strongly adsorbed by the pigment than was resin C.

(b) Preparation of paints (i) A millbase was prepared by dispersing 140 parts of rutile titanium dioxide in 51.6 parts of the above solution of resin VII together with 16.8 parts of white spirit. 254 parts of the (solution of) thixotropic alkyd base resin C (Example 3) were added to the millbase together with cobalt and lead driers in the proportions used above and 10 parts of dipentene. (20% auxiliary resin.)

(ii) A millbase was prepared by dispersing 161 parts of rutile titanium dioxide in a blend of 29.5 parts of the solution of auxiliary resin VII and 8.3 parts of the solution of resin A used in Example 1 together with 23.6 parts white spirit. A further 258 parts of the solution of resin A were then added together with cobalt and lead driers and dipentene. (10% auxiliary resin.) The paints were diluted to a viscosity of 4 poise with white spirit.

(c) Emulsification of paints

Both paints (i) and (ii) were satisfactorily emulsified from a brush by the test described in Example 1.

EXAMPLE 6

(a) Preparation of auxiliary resin VIII

An alkyd resin was prepared as 5% solution in xylol/white spirit (1:1) from the following ingredients and in the molar proportions: Pentaerythritol/dimethylol propionic acid/adipic acid/linseed oil fatty acid=1.15/5/5/3. The resin had an acid value of 130 and a hydroxyl value of 40. The resin, when pigmented, was emulsifiable by the test described in the specification.

In the test described in Example 1 resin VIII was more strongly adsorbed by the pigment than was resin A.

(b) Preparation of a paint

A gloss paint of viscosity 4 poise pigmented with titanium dioxide was prepared by the method of Example 1(c)I from base resin A using 10% auxiliary resin.

This paint could be readily removed from the brush by the test of Example 1.

EXAMPLE 7

(a) Preparation of base resin D

An oil-modified polyurethane alkyd was prepared as a 60% solids solution in white spirit from pentaerythritol/dimethylol propionic acid/phthalic anhydride/tolylene diisocyanate/linseed oil fatty acid in the weight ratio 1.0/1.2/0.5/0.96/3.0. The resin had an acid value of 48 mg. KOH/g. and a hydroxyl value of 17 mg. KOH/g. The resin was emulsifiable in the absence of pigment but when pigmented was incompletely emulsified by the test described in the specification. The resin was also emulsifiable in the absence of pigment, in a 5% solution of aqueous ammonia.

(b) Preparation of a paint

A millbase was prepared by dispersing 180 parts of rutile titanium dioxide in 40 parts of base resin D solution and 34 parts of auxiliary resin VIII solution and 200 parts of white spirit. To this millbase a further 332 parts of the solution of base resin D were added together with the driers as in Example 1.

A final paint of viscosity 4 poise could be easily removed from the brush by the test of Example 1 in either aqueous detergent or in a 5% solution of ammonia. A sample of paint containing triethylamine behaved similarly.

EXAMPLE 8

Gloss paints pigmented with titanium dioxide were prepared using base resin A according to the general method of Example 1(c)(II) employing Y% based on the total resin content of the following auxiliary resins IX–XI (i.e. in the absence of base resin A) when preparing the millbase. These auxiliary resins satisfied the specified adsorption and emulsification tests.

(IX) An ester of an aliphatic sulphodicarboxylic ester prepared according to U.S. Pat. 2,028,091 by condensing glycerol with soyabean fatty acids; further reacting with maleic anhydride; esterifying with amyl alcohol and treating with sodium bisulphite (Y=20).

X A boric acid polyester prepared by condensing soyabean oil fatty acid with glycerol at 240° C. and then with ortho boric acid at 180° C. Acid value 178 mg. KOH/g. (Y=20).

(XI) A cationic resin prepared by condensing glycerol/dimethylol propionic acid/adipic acid/soyabean oil fatty acid in molar ratio 1.51/1.71/2.48/3 and further condensing the resulting alkyd with 2.01 moles dimethyl amino ethanol at 200° C. (Y=10).

(XII) A copolymer of the 1:1 molar adduct of glycidyl methacrylate with poly-12-hydroxystearic acid/methyl methacrylate/acrylic acid in the weight ratio 50/37/13 of acid value 102 mg. KOH/g. (Y=10).

These paints were satisfactorily removed from a paint brush by the test of Example 1(d).

EXAMPLE 9

A gloss paint pigmented with titanium dioxide was prepared by the general method of Example 1(c)II from "Epikote" 1001 ("Epikote" is a registered trademark) as the base resin E and an auxiliary resin XIII of acid value 15.3 mg. KOH/g. and percent PEG=48.4 prepared from pentaerythritol/glycerol/poly(ethylene glycol) mol. wt. 800/phthalic anhydride/maleic anhydride/linseed oil fatty acid=1/1/1.5/0.78/1.55/3. (20% auxiliary resin.) The solvent was methyl isobutyl ketone. Shortly before use the paint was mixed with the appropriate amount of a polyamide curing agent commercially available as Versamid 115 and tested by the method of Example 1. The paint was readily removed from the brush.

What we claim is:

1. A method of producing a paint composition, said composition comprising a pigmented solution of a water-insoluble film forming base resin in a water-immiscible liquid and the solution of base resin being completely emulsifiable in an aqueous synthetic detergent solution when the pigment is absent but incompletely coemulsifiable therein with pigment when the pigment is present, said method comprising the step of treating the pigment in dispersion in a water-immiscible liquid with an auxiliary resin which (a) is soluble in said water-immiscible liquid, (b) is coemulsifiable in the aqueous detergent solution with the pigment when dissolved in the water-immiscible liquid of the paint composition, as determined by a test wherein 2 parts of a pigmented solution of 10 parts of the auxiliary resin in 100 parts of the water-immiscible liquid, containing 100 parts of rutile titanium dioxide as pigment, is formed into an emulsion by vigorous shaking with 50 parts of water containing 0.33 part of sodium dodecyl benzene sulphonate when the auxiliary resin contains anionic and/or non-ionic groups or containing 0.5 part cetyl pyridinium bromide when the auxiliary resin contains cationic groups, and a co-emulsifiable resin shows substantially no settlement after standing for 10 minutes, (c) is preferentially adsorbed by the pigment from a solution of both the base resin and the auxiliary resin in the water-immiscible liquid of the paint composition, as determined by a test wherein the pigment is treated with a solution in the water-immiscible liquid of base resin and auxiliary resin, said resins being in the relative proportions present when the pigment is treated by the process and thereafter measuring at equilibrium the relative amounts of resin absorbed and (d) is compatible with said base resin in that the two resins form one phase when mixed in any proportions.

2. A method according to claim 1 wherein at least a proportion of the pigment is treated with said auxiliary resin in dispersion in a water-immiscible liquid with the auxiliary resin in the absence of base resin.

3. A method according to claim 1 wherein at least a proportion of the pigment is treated in dispersion in a water-immiscible liquid with the auxiliary resin in the presence of such a proportion of the base resin that the total resin present is not more than 50% of the total resin content of the final paint composition.

4. A method according to claim 1 wherein at least a proportion of the pigment dispersed in a water-immiscible liquid in the presence of the total base resin content of the paint composition is treated with auxiliary resin.

5. A method according to claim 1 wherein the pigment is treated with not more than 50% by weight of an auxiliary resin based on the total resin content of the paint composition.

6. A method according to claim 5 wherein the pigment is treated with not more than 25% by weight of an auxiliary resin based on the total resin content of the paint composition.

7. A method according to claim 1 wherein the pigment comprises titanium dioxide.

8. A method according to claim 1 wherein the water-immiscible liquid comprises an aliphatic hydrocarbon boiling in the range 100–300° C.

9. A method according to claim 1 wherein the base resin and the auxiliary resin are both of the same chemical class.

10. A method according to claim 1 wherein the base resin comprises a drying oil-modified alkyd resin.

11. A method according to claim 1 wherein the base resin comprises a polyamide-modified drying oil-modified alkyd resin.

12. A method according to claim 1 wherein the auxiliary resin comprises a drying oil-modified alkyd resin.

13. A method according to claim 1 wherein the auxiliary resin comprises a random, graft or block copolymer soluble in the water-immiscible liquid.

14. A method according to claim 1 wherein the auxiliary resin contains non-ionic hydrophilic groups.

15. A method according to claim 14 wherein the non-ionic groups comprise polymerized moieties of ethylene oxide.

16. A method according to claim 14 wherein the non-ionic groups are moieties of poly(ethylene glycol).

17. A method according to claim 16 wherein the auxiliary resin contains at least 5% by weight based on the total weight of auxiliary resin of poly(ethylene glycol) moieties.

18. A method according to claim 16 wherein the poly(ethylene glycol) moieties have a molecular weight of 100–5000.

19. A method according to claim 16 wherein the auxiliary resin has an acid value of less than 30.

20. A method according to claim 14 wherein the non-ionic hydrophilic groups comprise hydroxyl groups.

21. A method according to claim 20 wherein the hydroxyl value of the auxiliary resin is 30–170 mg. KOH/g.

22. A method according to claim 1 wherein the auxiliary resin contains anionic or cationic groups.

23. A method according to claim 22 wherein the ionic groups are carboxyl, sulphonate, phosphate or borate groups.

24. A method according to claim 23 wherein the acid value of the auxiliary resin is 40–200 mg. KOH/g. and the acid value of the base resin is less than 10 mg. KOH/g.

25. A method according to claim 22 wherein the ionic groups are tertiary amine quaternary ammonium salts or primary or secondary amine salts.

26. A paint composition which comprises a pigmented solution of a water-insoluble film forming base resin in a water-immiscible liquid, the solution of base resin being completely emulsifiable in an aqueous synthetic detergent solution when the pigment is absent but incompletely co-emulsifiable therein with pigment when the pigment is present, and wherein the pigment is associated with an auxiliary resin which (a) is soluble in said water-immiscible liquid, (b) is co-emulsifiable in the aqueous detergent solution with the pigment when dissolved in the water-immiscible liquid of the paint composition, as determined by a test wherein 2 parts of a pigmented solution of 10 parts of the auxiliary resin in 100 parts of the water immiscible liquid, containing 100 parts of rutile titanium dioxide as pigment, is formed into an emulison by vigorous shaking with 50 parts of water containing 0.33 part of sodium dodecyl benzene sulphonate when the auxiliary resin contains anionic and/or non-ionic groups or containing 0.5 part cetyl pyridinium bromide when the auxiliary resin contains cationic groups, and a co-emulsifiable resin shows substantially no settlement after standing for 10 minutes, (c) is preferentially adsorbed by the pigment from a solution of both the base resin and the auxiliary resin in the water-immiscible liquid of the paint composition and as determined by a test wherein the pigment is treated with a solution in the water-immiscible liquid of base resin and auxiliary resin, said resins being in the relative proportions present and the pigment is treated by the process and thereafter measuring at equilibrium the relative amounts of resin absorbed and (d) is compatible with said base resin in that the two resins form one phase when mixed in any proportions.

27. A paint composition according to claim 26 which contains a neutralizing base.

28. A paint composition according to claim 27 wherein the neutralizing base is ammonia or an amine.

References Cited

UNITED STATES PATENTS

| | | | |
|---|---|---|---|
| 2,591,904 | 4/1952 | Zola | 106—170 X |
| 3,433,753 | 3/1969 | Farkas et al. | 260—22 A |
| 3,505,268 | 4/1970 | Backhouse et al. | 260—31.2 |
| 3,600,346 | 8/1971 | Spatola | 260—22 R |
| 3,232,903 | 2/1966 | Schmidle et al. | 260—33.6 |
| 3,419,515 | 12/1968 | Schmidle et al. | 260—33.6 |
| 3,532,662 | 10/1970 | Ansdell | 260—34.2 |
| 3,573,237 | 3/1971 | Zola | 260—16 |
| 3,580,880 | 5/1971 | Clarke et al. | 260—29.6 R |

DONALD E. CZAJA, Primary Examiner

R. W. GRIFFIN, Assistant Examiner

U.S. Cl. X.R.

117—161 K; 260—22 CB, 32.4, 32.6 R, 33.6 EP, 33.6 R, 37 EP, 40 R